United States Patent [19]

Lloyd et al.

[11] Patent Number: 5,370,717
[45] Date of Patent: Dec. 6, 1994

[54] TOOL INSERT

[76] Inventors: Andrew I. G. Lloyd, 52 15th St., Johannesburg; Klaus Tank, 9 Warbleton Ave., Johannesburg, both of South Africa

[21] Appl. No.: 103,090

[22] Filed: Aug. 6, 1993

[30] Foreign Application Priority Data

Aug. 6, 1992 [ZA] South Africa .................. 92/5899

[51] Int. Cl.$^5$ .................................................. B24D 3/02
[52] U.S. Cl. ............................................. 51/293; 51/295; 51/309
[58] Field of Search ........................... 51/295, 309, 293

[56] References Cited

U.S. PATENT DOCUMENTS

| | | | |
|---|---|---|---|
| 4,457,765 | 7/1984 | Wilson | 51/295 |
| 4,592,433 | 6/1986 | Dennis | 175/329 |
| 4,605,343 | 10/1986 | Hibbs, Jr. et al. | 51/295 |
| 4,690,691 | 9/1987 | Komanduri | 51/295 |
| 4,789,385 | 12/1988 | Dyer et al. | 51/309 |
| 4,797,138 | 1/1989 | Komanduri | 51/309 |
| 4,861,350 | 8/1989 | Phaal et al. | 51/295 |
| 4,866,885 | 9/1989 | Dodsworth | 51/295 |
| 4,956,238 | 9/1990 | Griffin | 51/295 |
| 4,972,637 | 11/1990 | Dyer | 51/295 |
| 4,997,049 | 3/1991 | Tank et al. | 175/410 |
| 5,007,207 | 4/1991 | Phaal | 51/295 |
| 5,057,124 | 10/1991 | Cerceau | 51/293 |
| 5,154,245 | 10/1992 | Waldenstrom et al. | 175/420.2 |

*Primary Examiner*—Mark L. Bell
*Assistant Examiner*—Deborah Jones
*Attorney, Agent, or Firm*—Scully, Scott, Murphy & Presser

[57] ABSTRACT

A tool insert comprising an abrasive compact layer having a working surface and an opposite surface bonded to a cemented carbide substrate along an interface. At least one cemented carbide projection extends through the compact layer from the compact/substrate interface to the working surface in which it presents a matching surface. The total area of the carbide matching surface is less than that of the compact working surface. The cemented carbide projection may take the form of one or more islands, or the form of a skeleton enclosing within it a plurality of discrete abrasive compact zones or sections.

8 Claims, 3 Drawing Sheets

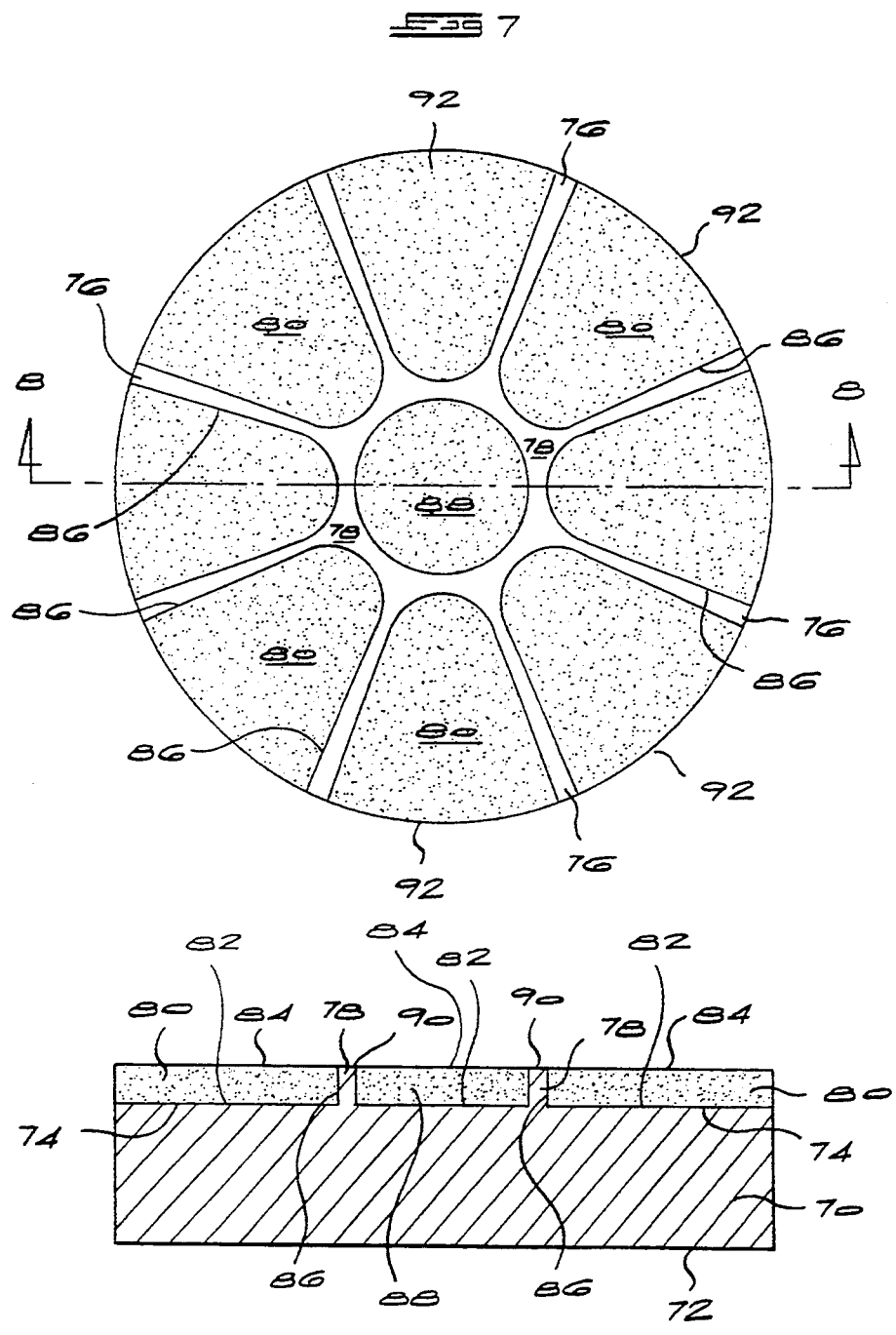

TOOL INSERT

BACKGROUND OF THE INVENTION

This invention relates to a tool insert.

Abrasive compacts are used extensively in cutting, milling, grinding, drilling and other abrasive operations. The abrasive compacts consist of a mass of diamond or cubic boron nitride particles bonded into a coherent, polycrystalline hard conglomerate. The abrasive particle content of abrasive compacts is high and there is an extensive amount of direct particle-to-particle bonding. Abrasive compacts are made under elevated temperature and pressure conditions at which the abrasive particle, be it diamond or cubic boron nitride, is crystallographically stable. Abrasive compacts tend to be brittle and in use they are frequently supported by being bonded to a cemented carbide substrate. Such supported abrasive compacts are known in the art as composite abrasive compacts. The composite abrasive compact may be used as such in the working surface of an abrasive tool.

Composite diamond abrasive compacts are generally manufactured by placing a layer of diamond particles on a cemented carbide body to form an unbonded assembly and then subjecting that unbonded assembly to elevated temperature and pressure conditions at which diamond is crystallographically stable. Cobalt from the carbide substrate infiltrates the diamond mass during the compact manufacture. In so doing, the carbide substrate in the region of the compact/substrate interface is depleted of cobalt giving rise to stresses in the substrate. These stresses can lead to failure of the composite compact during use.

U.S. Pat. No. 4,592,433 describes a cutting blank comprising a substrate formed of cemented carbide and including a cutting surface. A plurality of shallow grooves are formed in the cutting surface and strips of diamond compact are disposed in the grooves. The strips may be arranged in various patterns. In use, the carbide material wears away exposing the diamond strips which cut through a substrate in a rake or claw-like manner. The relatively soft carbide material dominates in the cutting surface so that the harder diamond strips can be exposed, in use.

U.S. Pat. No. 5,154,245 discloses rock bit buttons of cemented carbide containing a plurality of polycrystalline diamond bodies, each of which is completely surrounded by cemented carbide. Thus, there are a plurality of polycrystalline diamond islands in a cemented carbide working surface.

U.S. Pat. No. 4,997,049 discloses a cemented carbide tool insert having a recess with sloping sides formed therein and in which an abrasive compact is located. In one embodiment the recess is an annulus located in one of the carbide end surfaces.

SUMMARY OF THE INVENTION

According to the present invention, a tool insert comprises an abrasive compact, particularly a diamond abrasive compact, layer having a working surface and an opposite surface bonded to a cemented carbide substrate along an interface, and at least one cemented carbide projection which extends through the compact layer from the compact/substrate interface to the working surface in which it presents a matching surface, the total area of carbide matching surface being less than that of the compact working surface.

DESCRIPTION OF THE DRAWINGS

FIG. 7 is a plan view of a third embodiment of a tool insert of the invention; and FIG. 8 is a section along the line 8—8 of FIG. 7.

DESCRIPTION OF EMBODIMENTS

Figure 1:
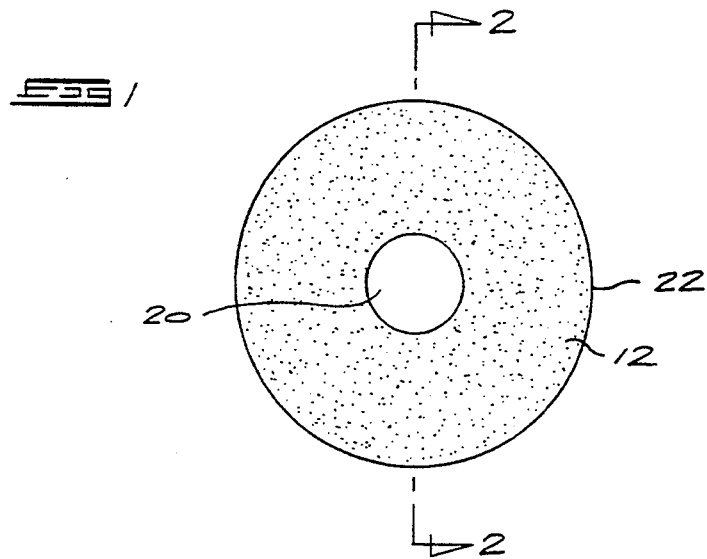
FIG. 1 illustrates a plan view of an embodiment of a tool insert of the invention.

The working surface of the compact layer may have any desired profile dictated generally by the tool in which the insert is to be used. The working surface may be flat or curved. When the working surface is flat, it will provide a cutting edge. The cutting edge may be continuous or it may be broken at one or more points by cemented carbide. When the working surface is curved, that surface, or at least a portion of that surface, will provide a cutting surface. An example of a curved surface is a hemispherical surface.

The total area of carbide matching surface will generally be substantially less than, e.g. less than 20 percent, that of the compact working surface.

The carbide surface or surfaces in the compact working surface, are matching in the sense that they form a continuous profile with the compact working surface.

In one form of the invention, each carbide matching surface in the compact working surface defines, in effect, an island. Thus, the carbide matching surfaces, in this form of the invention, define discrete, separate entities.

In another form of the invention, the carbide surface defines a skeleton enclosing within it the compact working surface. The skeleton may take any one of a number of different forms, one of which is essentially the form of the spokes of a wheel radiating outwards from a central point. In this form of the invention, the compact working surface will be made up of a plurality of discrete zones or sections.

The cemented carbide projection or projections may be bonded to the substrate, or may form an integral part of the substrate.

The cemented carbide projection and substrate may be made of the same cemented carbide or of different cemented carbide. Any cemented carbide known in the art such as cemented tungsten carbide, cemented tantalum carbide, cemented titanium carbide, cemented molybdenum carbide and mixtures thereof may be used. As is known in the art, cemented carbides contain a binder phase, generally present in an amount of 3 to 15 percent by mass. The binder is typically a transition metal such as cobalt, nickel or iron or an alloy thereof.

The cemented carbide projection may contain a minor amount, i.e. less than 10 percent by volume, of diamond or cubic boron nitride particles.

The abrasive compact may be any known in the art, but will generally be a cubic boron nitride or diamond compact. The abrasive compact is preferably a diamond compact. Diamond compacts have a diamond content of at least 70 percent by volume and are polycrystalline in nature. They will contain a second phase containing a diamond catalyst which is typically nickel, cobalt or iron.

An embodiment of the invention will now be described with reference to FIGS. 1 and 2. Referring to these figures, a tool insert comprises an abrasive compact 10 having flat surfaces 12 and 14 on opposite sides thereof. The surface 12 provides the working surface for the tool insert, while the surface 14 is bonded to a cemented carbide substrate 16. This cemented carbide substrate may be any known in the art. The cemented carbide substrate 16 has a projection 18 which extends through the compact 10 from the surface 14 to the working surface 12 of the compact. The projection 18 provides an island 20 of carbide in the working surface 12 of the compact. The carbide island 20 lies in the same plane as that of the working surface 12 of the compact. Peripheral edge 22 of the abrasive compact provides a cutting edge which consists entirely of abrasive compact.

The projection 18 reduces the stresses which are created in the carbide substrate 16 during manufacture of the tool insert thereby reducing failure of the tool insert in use.

Figure 2:
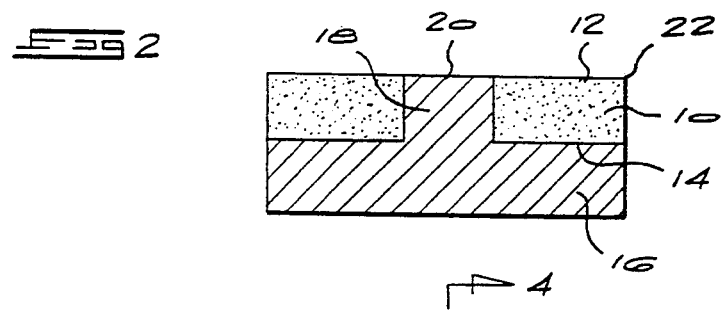
FIG. 2 is a section along the line 2—2 of FIG. 1.
Figure 3:
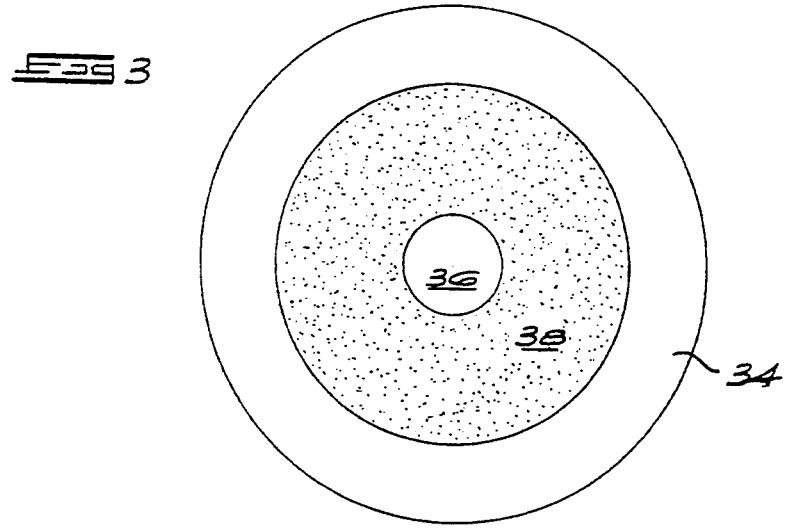
FIG. 3 is a plan view of an unbonded assembly for use in producing the tool insert of FIG. 1.
Figure 4:
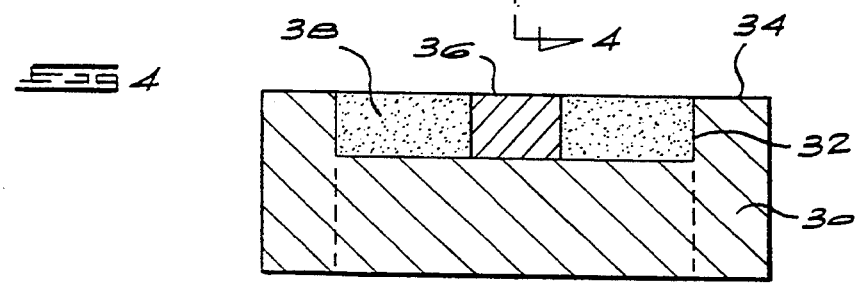
FIG. 4 is a section along the line 4—4 of FIG. 3.

The tool insert of FIGS. 1 and 2 may be produced from an unbonded assembly illustrated by FIGS. 3 and 4. Referring to these figures, the assembly comprises a cemented carbide body 30 having a recess 32 formed in the upper surface 34 thereof. A bonded mass 36 of carbide particles is placed centrally in the recess 32. A bonded mass 38 of diamond particles is located in the recess 32 around the carbide mass 36. The masses 36, 38 will typically comprise the particles uniformly dispersed in a suitable organic binder.

The unbonded assembly is heated to volatilise most of the organic binder. Some binder remains to retain the bonding in the masses 36, 38. Thereafter, the unbonded assembly is placed in a reaction capsule which itself is placed in the reaction zone of a high temperature/high pressure apparatus. The contents of the reaction capsule are subjected to diamond synthesis conditions, e.g. a temperature of the order of 1400°-1600° C. and a pressure of the order of 50 to 60 kilobars, and these conditions are maintained for a period of 10 to 15 minutes. Binder such as cobalt from the carbide body 30 infiltrates both the diamond and carbide masses. A diamond compact (10 in FIGS. 1 and 2) is produced from the diamond mass 38, while a cemented carbide insert or projection (20 in FIGS. 1 and 2) is produced from the carbide mass 36. Both the diamond compact and the cemented carbide projection are firmly bonded to the carbide substrate 30 and to each other.

To produce a tool insert of the type illustrated by FIG. 1, the sides of the substrate 30 are removed by grinding or other suitable means back to the dotted lines shown in FIG. 4.

A second embodiment of the invention will now be described with reference to FIGS. 5 and 6. Referring to these figures, there is shown a tool insert comprising an elongate cemented carbide substrate 50 which is generally right-circular, cylindrical in shape. The substrate 50 has one end 52 adapted to be mounted in the working surface of a tool and an opposite working end 54. The working end 54 of the substrate is hemispherical. An abrasive compact layer 56 is provided in the working end 54. This abrasive compact layer has six evenly spaced cemented carbide projections 58 extending through it.

The projections 58 extend through the compact layer 56 and terminate at the hemispherical surface 60 of the layer 56. As can be seen clearly from FIG. 5, the top surfaces 62 of the projections 58 provide a plurality of cemented carbide islands in the compact working surface 60.

Further, the surfaces 62 follow the hemispherical contour of the compact working surface 60.

In use, the end 52 of the insert will be mounted in the working surface of a tool such as a drill bit. The hemispherical surface 60 will provide the cutting or abrading surface for the insert. The compact layer 56 will be harder than the cemented carbide projections 58 which will tend to wear away quicker. This wearing away will create sharp cutting edges within the surface 60, improving the cutting action of the tool insert. Further, the projections 58 reduce stress formation in the carbide substrate 50.

The sides 64 of projections 58 may slope towards or away from each other, or these sides may be parallel to each other.

Figure 6:
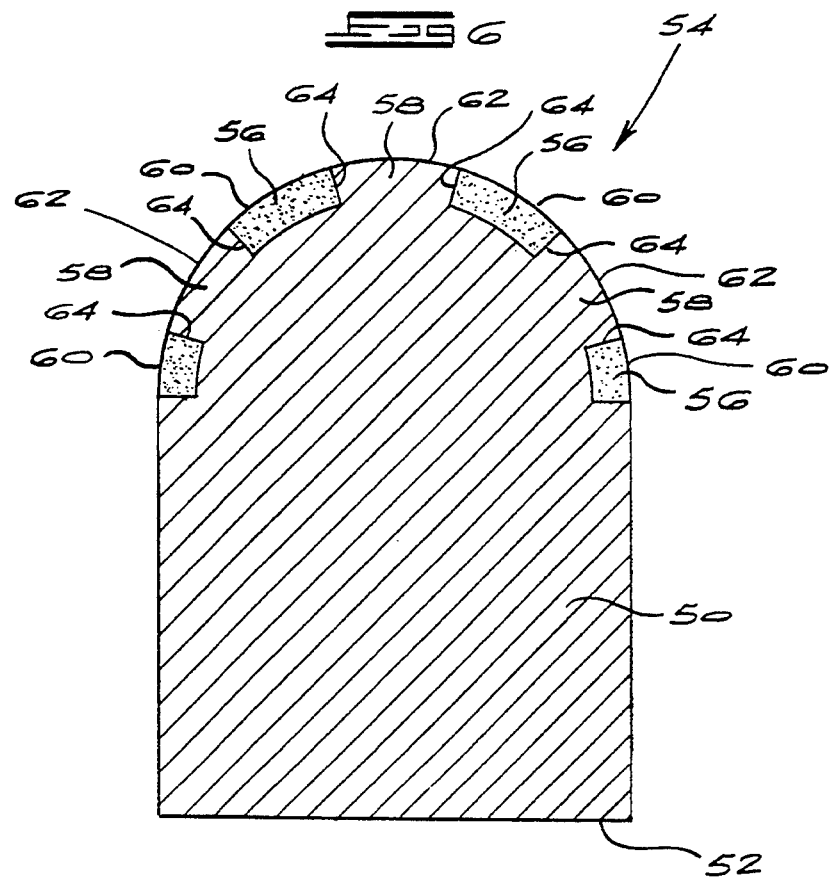
FIG. 6 is a section along the line 6—6 of FIG. 5.
Figure 5:
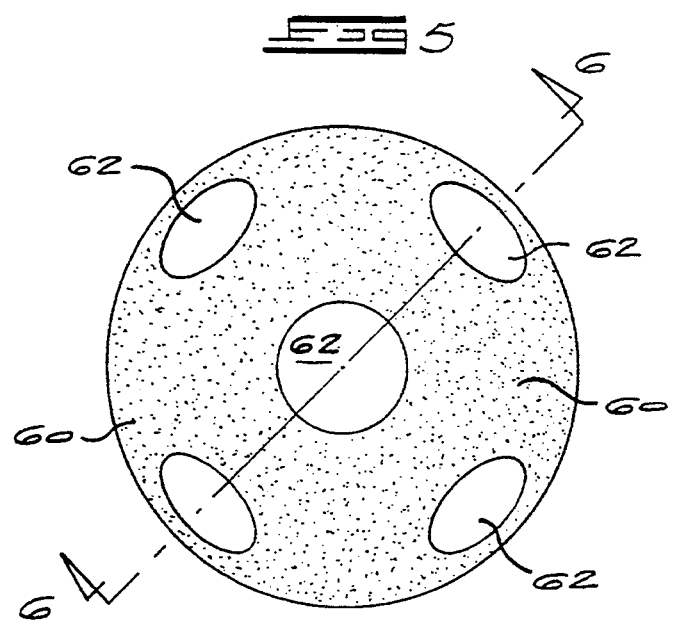
FIG. 5 is a plan view of a second embodiment of a tool insert of the invention.

The tool insert of FIGS. 5 and 6 may be produced using generally the method described in U.S. Pat. No. 5,030,250. In this method, the substrate will be suitably shaped with an end surface providing the desired projections. The slurry, or similar form, of the components, in particulate form, necessary to make the compact layer will be pressed or squeezed between adjacent projections on insertion of the substrate into the container.

A third embodiment of the invention will now be described with reference to FIGS. 7 and 8 of the accompanying drawings. Referring to these figures, a tool insert comprises a cemented carbide substrate 70 having a flat base surface 72. Extending upwards from an upper surface 74 is a skeleton-type projection which takes the form of spokes 76 of a wheel radiating out from a central circular region 78. The skeleton-type projection is integrally formed with the substrate 70.

Located between adjacent spokes 76 are abrasive compact layers or zones 80. Each zone 80 has a base 82, a top flat surface 84 and sides 86 joining the top surface and base. The base and sides are firmly bonded to the cemented carbide substrate 70, and spokes 76 and central region 78, respectively. Located within the central region 78 of the carbide projection is a further abrasive compact layer or zone 88, also firmly bonded to the carbide substrate and central region. Compact zone 88 presents a top flat surface 84. The various abrasive compact zones 80, 88 together form an abrasive compact layer for the insert.

The top surfaces 84 of the abrasive compact zones 80, 88 all lie in the same plane and together define a working surface. Further, the upper surface 90 of the spokes 76 and central region 78 lie in the same plane as that of the upper surfaces 84 of the abrasive compact zones 80, 88. The peripheral edges 92 of the abrasive compact zones 80 provide cutting edges for the tool insert. The cutting edges are separated by edges of the carbide spoke upper surfaces 90.

The tool insert of FIGS. 7 and 8 may be made by a method which is essentially the same as that described for the manufacture of the tool insert of the embodiment of FIGS. 1 and 2.

We claim:

1. A tool insert comprising:
   an abrasive compact layer having a working surface and an opposite surface bonded to a cemented carbide substrate along an interface, and at least one cemented carbide projection which extends through the compact layer from the compact/substrate interface to the working surface in which it presents a carbide matching surface, said carbide matching surface defining an island in the compact working surface, wherein the total area of said carbide matching surface is less than 20 percent of the compact working surface.

2. A tool insert according to claim 1 wherein the compact working surface is flat and provides a cutting edge.

3. A tool insert according to claim 2 wherein the cutting edge is continuous.

4. A tool insert according to claim 1 wherein the working surface is curved, at least a portion of that surface providing a cutting surface.

5. A tool insert according to claim 4 wherein the curved surface is a hemispherical surface.

6. A tool insert according to claim 1 wherein the abrasive compact is a diamond compact.

7. A tool insert according to claim 1 wherein the island is wholly enclosed within the compact working surface.

8. A tool insert according to claim 7 wherein:
the island has a continuous outside peripheral edge extending completely around the island; and
the compact working surface extends completely around and encloses the outside peripheral edge of the island.

* * * * *

UNITED STATES PATENT AND TRADEMARK OFFICE
CERTIFICATE OF CORRECTION

PATENT NO. : 5,370,717
DATED : December 6, 1994
INVENTOR(S) : Andrew I. G. Lloyd, et al.

It is certified that error appears in the above-indentified patent and that said Letters Patent is hereby corrected as shown below:

Column 3, line 7: "fiat" should read --flat--

Column 4, lines 35 & 49: "fiat" should read --flat--

Signed and Sealed this

Nineteenth Day of September, 1995

Attest:

BRUCE LEHMAN

Attesting Officer

Commissioner of Patents and Trademarks